United States Patent [19]

Fondiller

[11] Patent Number: 4,678,157

[45] Date of Patent: Jul. 7, 1987

[54] APPARATUS FOR THE CONSTRUCTION OF A LOW COST STRUCTURE

[76] Inventor: Robert Fondiller, 200 W. 58th St., New York, N.Y. 10019

[21] Appl. No.: 645,802

[22] Filed: Aug. 30, 1984

[51] Int. Cl.[4] ........................ B28B 7/32; B29C 41/08; E04B 1/34; E04G 11/02

[52] U.S. Cl. ........................................... 249/65; 52/2; 52/749; 264/31; 264/309; 264/314

[58] Field of Search ................. 52/2, 80, 749; 264/32, 264/31, 309, 314, 33, 34; 249/65

[56] References Cited

U.S. PATENT DOCUMENTS

| | | | |
|---|---|---|---|
| 2,270,229 | 7/1942 | Neff | 249/65 X |
| 3,643,910 | 2/1972 | Heifetz | 249/65 |
| 4,102,956 | 7/1978 | Heifetz | 249/65 X |

FOREIGN PATENT DOCUMENTS

| | | | |
|---|---|---|---|
| 2701855 | 7/1977 | Fed. Rep. of Germany | 249/65 |

*Primary Examiner*—Stuart S. Levy
*Assistant Examiner*—Lynn M. Sohack

[57] ABSTRACT

The present invention provides a method and apparatus for the construction of a low-cost building structure through the synergistic composition of material, process, and structural design. In a first embodiment, a specially fashioned balloon, in the shape of a house, is used as a one-sided form, and is sprayed with a building material formulation. The building formulation may include: structural material, reinforcing material such as fibers to eliminate or minimize separate structural reinforcement, a gaseous bubble material (to provide thermal insulation), and other ingredients such as fillers, strengtheners, bulk-formers, accelerators, coloring agents and dryers. The structure can be created rapidly, and the balloon deflated and removed in minimum time, all by a few as 2 men. The low cost of the labor and materials and equipment used according to the present invention result in a more economical method of creating a building than any presently known method.

9 Claims, 57 Drawing Figures

192
166
164
168
166
170
164
170

172

178
180
172
174
176

186
188
184
182
180

190

160
162

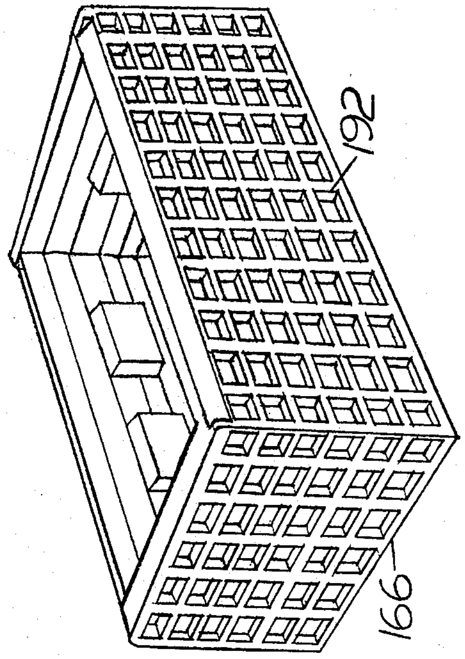
FIG 11
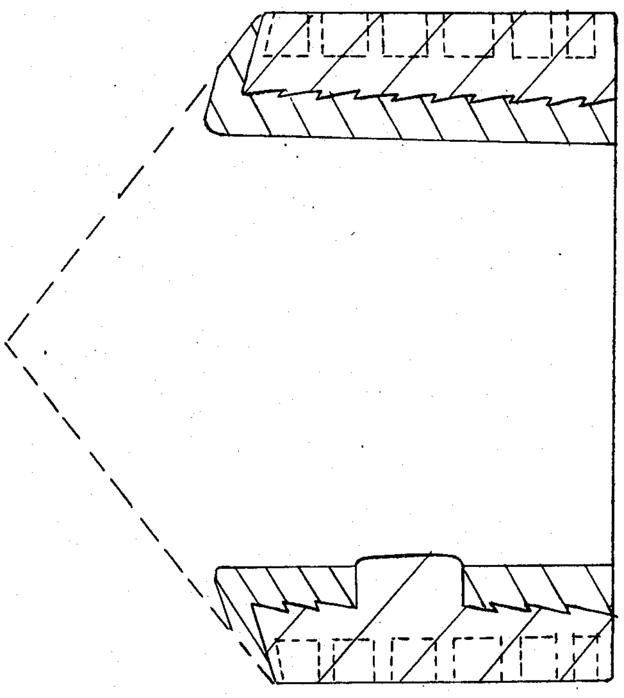

300
302
304
306
308
312
314
316
318
320
322

400
402
404
406
408
410
412
420
422
502
504
506
508
512
514
516
518
520
522
524
526

600
614
606
612

602
604
608
610
610
610
612
614
600
622

616
618
620
610

APPARATUS FOR THE CONSTRUCTION OF A LOW COST STRUCTURE

BACKGROUND OF THE INVENTION

Food, clothing, & shelter are the three basic human needs. Tens of millions of people around the globe have no home. In mature civilizations, like the United States, housing costs and interest rates have put home ownership out of reach of many millions of people.

The criteria for the ideal housing structure to meet the above need include: utilization of materials that are low cost & easily available; a structure that is easily and quickly erected, substantial, & attractive; utilization of minimal amounts of labor with minimal skill levels; low cost; minimal construction time; utilization of low-cost construction equipment which is easily used, easily maintained, easily transported, & easily repaired.

The prior art includes numerous examples of attempts to fulfill these objectives, all of which are subject to numerous deficiencies.

The following is a summary of the prior art related to methods and apparatus for the construction of low cost structures, a. The International Basic Economy Corporation's system in Puerto Rico used a huge integral steel form to cast all the walls of the house integrally. First, the floor slab was poured, Then, reinforcing bars for the walls were assembled, and tied in place. After the slab cured, a huge crane set the steel form (consisting of an outside wall and an inside wall-between which the concrete was poured) in place on the slab. Then the concrete was poured, and vibrated to eliminate air pockets. Days later, the huge form was stripped away by the huge crane, cleaned, & set in place to pour the next house. The problems with his system include: long cycle time per house, the use of a very expensive steel form, a requirement for vibrating the concrete, a huge crane needed, many laborers needed—including highly-skilled & expensive crane operator, foreman, & engineer; a need to use reinforcing bars; and a need to assemble & tie the reinforcing bars all in place.

b. Another example of a building system utilizes reuseable steel or aluminum form panels, which are used to support the inner and outer surfaces of the concrete walls as they are poured, The problems with this system include: a relatively large amount of labor to assemble in place; a need for stripping and cleaning the panels after each use; the need for disassembling of the panels after each use, and the need for vibrating of the concrete to prevent airpockets.

c. Another example of a building system uses tilt-up construction where the floor slab is used as the form for the casting of wall and roof slabs which are then tilted up into position. The problems with this system include: long cycle time per house; corner posts have to be formed & cast to hold the walls together in the four corners of the house, and getting the roof slab on top of the walls takes substantial effort.

d. Another building system utilizes pre-cast concrete parts. The problems with this system include: major investment required to establish a casting plant; cracking & breaking of pre-cast parts between factory and final assembly; substantial effort is required to seal the pre-cast parts into an integral structure and the cost of truck operating to deliver parts from factory to the building sites.

e. Still another building utilizes a spray-on balloon structure. Problems with this system result from the igloo shape of the structure. The igloo shape is not attractive to customers because the non-vertical walls create waste space immediately adjacent to them, as a result of their angle to the floor. People are generally uncomfortable in rooms that do not have vertical, flat, and parallel walls because it seems to disturb their needs for a rectangular frame of reference and land plots are generally rectangular, not round so a round house does not fit its's land well.

SUMMARY OF INVENTION

The present invention provides a novel method and apparatus for the construction of low cost structures. The invention provides a novel, synergistic system which includes a combination of two or more of the following elements, to provide a better, faster and cheaper structure, which overcomes the problems of prior art.

a. SPRAY MEANS—For purposes of illustration only, spray equipment as manufactured by Allentown Pneumatic Gun Company may be utilized.

b. SPRAY MATERIAL—For purposes of illustration, a standard shotcrete composition of cement, sand, and limited amounts of water or sprayable plastics such as urethane foam or other composition material having the necessary characteristics to form sections or structure may be used.

c. FOAMING AGENT—A foaming agent may be used to decrease the amount of sprayed material used to provide a better thermal barrier and lighten the weight of the structure. The use of a foaming agent reduces the weight of both the roof and the walls since a lighter roof requires thinner supporting walls beneath it.

d. HOLLOW BALLS—Hollow balls may be used to achieve the immediately above results and also to constitute a cosmetic wall treatment.

e. COLORING AGENT—A coloring agent may be used to color the sprayed material.

f. ADDITIVES—Special purpose additives may be used optionally for purposes such as: insect-repelling, fire retardation, binders, low cost bulk providers (such as clay, soil, etc.), dryers and accelerators.

g. STRENGTHENERS—Strengtheners such as metal, glass or plastic fibers (which may be coated to resist akali), or other material, such as chicken wire mesh, whose presence eliminates or minimizes the need for adding reinforcements to the structure, may be utilized.

h. BALLON—A custom-constructed balloon having the dimensions and shape of the inside, or outside of the desired structure which is easily and quickly inflatable and deflatable made of a lightweight and inexpensive material may be utilized.

i. INTERNAL STRICTURES—Uses strictures inside the balloon, to conform the balloon to the desired shape: flat, straight, vertical walls may be utilized.

j. EXTERNAL STRICTURES—Strictures outside the balloon, to conform the balloon to the desired shape: flat, straight, vertical walls may be utilized.

k. APERTURE BUMPS—Aperture bumps may be provided on the balloon, which are then sprayed with material on the side of the bump perpendicular to the body of the balloon, but not on the large surface of the bump parallel to the balloon—to leave openings for doors and windows. The bumps can be integral with the balloon or attachable & detachable at any chosen location, The bumps can be inflated from inside the balloon, or independently inflated. The bumps can protrude sufficiently from the balloon surface to form an aperture all the way through the wall, or the bumps can be sufficiently shallow so that they merely form an indent on the inside of the wall of the structure (with no opening from the inside to the outside of the wall of the structure)—for a closet, bookcase, hifi, or (with an external balloon) a bay window.

l. MULTI LAYER SECTIONS—Multi-layer construction may be utilized for walls, roofs, floors, or ceilings. Plastic foam, because of all the air spaces therein, is a better thermal barrier than concrete, however, plastic foam has problems: while it is not food for insects, they will burrow into it to make a home; sunlight deteriorates the plastic foam; plastic foam is combustible so to overcome these problems plastic foam is used in a tri-layer configuration, with concrete on each side of it, or interspersed throughout the matrix.

m. HEIGHT GUIDES—Height guides in accordance with the invention are small Eiffel Tower-shaped objects which are adhesively attached to the balloon. The spray hoseman sprays up to the tip of the height guides to get the proper material thickness. In the case of the sandwich construction, the thickness of each layer is marked on the height guide.

n. TEXTURED SURFACES—Textured surfaces are easily achieved on the surface of the sprayed structural material by texturing the surface of the balloon (or balloon cover) on which the material is sprayed. The exterior wall can be textured to a stucco patters, a brick pattern, or whatever texture is desirous by dealing with the exterior surface before it hardens, or by adding another layer, which latter layer is then textured or by using an external balloon.

o. REUSEABLE FRAMES—Reuseable frames may be provided which are tapered for easy removal, and attached (adhesively) to the balloon. This option is especially useful in tropical climates where windows are not wanted just apertures.

p. TIE DOWNS—Tie downs are provided if needed, because of the tendency of the balloon to provide a wall that curves inward at the floor level instead of making a vertical, right angle with the floor.

q. ROOF—The form of the roof has many options. The simplest is the dome, whose curvature is continuous with the vertical walls. Another option is to place supporting rods, across the walls a thin sheet of any membrane can be stretched across the supporting rods, and the building material can be sprayed over them to form roof eaves of the desired thickness. Height guides can be employed on the eave-supporting rods.

r. SEPARATE ROOF—A separate roof can be employed.

s. RUN OFF—Rainfall run off may require that the floor slab extend beyond the eaves, so that heavy rain does not wash away the earth from under the structure.

t. FLOOR—Provision of a floor in the structure is optional. In some cultures an earthen floor is desired. Floors are sometimes more economically poured than sprayed. Pouring also makes it easier to screed a smooth surface.

U. REINFORCEMENT—The use of reinforcement is optional. When a floor slab is poured, it is possible to insert vertically oriented reinforcing rods before the slab is poured to tie the walls (when they are put in place, later) to the floor. A frame can be built of metal or wood or other material, placed outside the balloon, and sprayed over when the structure is formed. This last system is applicable in the case of a separate roof, or a second floor.

v. WATER COLLECTION—Water collection can be achieved by adding a vertical rib around the periphery of the roof, to form a catch basin.

w. WATER TANK—A water tank may be provided in the form of an open flower pot-shaped addition to the roof and resting directly over a wall (because of the great weight of the water.) to furnish water under some pressure to the residents.

x. PLUMBING—Plumbing for the structure can be spaced from the side of the balloon, and sprayed within the wall, or attached later, to the room side of the completed wall.

y. ELECTRICAL WIRING—Electrical wiring can be put in place outside the balloon, and sprayed integrally into the wall or added later to the inside of the structure, a horizontal baseboard strip, prefabricated wiring panel.

z. FILLERS—Fillers such as soil, clay, sand, refuse, broken glass, metal scrap, chopped auto tires, low-cost local material, bulk-producers, etc.—all of which provides structural material at minimal cost, may be utilized.

aa. GAS BUBBLES—Gas bubbles may be beaten into (like a malted milk), blow into (as with compressed air, or other gas), or otherwise delivered into the structural material.

ab. FLATTENERS—A variety of flatteners to provide flat surface to the structure may be utilized such as: stretching the membrane over a frame; reinforcing with stiff webbing; use of panels (of metal, plastic, glass, corrugated cardboard, honeycomb, or other sheet: extruded or rolled or cast or embossed with a pattern, mesh, placing panels or sheets on a supporting structure—such as an internal or external balloon or without a supporting structure, or without a balloon; and using a material such as duct tape to smoothly hold flat surfaces and bumps and frames; etc., and using collapsible and—extensible apparatus such as Archimedes Scissors to support and flatten the balloon surfaces.

ac. PATTERNED SHEETS—Patterned sheets which are generated by embossing tooling (which can be rollers, molds, stamps, etc.) may be used with or or without self-ribbing (for stiffness), and with or without a supporting balloon, or other structure. To be used to give a pattern to the material sprayed on its surface.

ad. HARDENERS—Soil hardeners which permit the use of low or no costindigenous materials such as soil or clay may be utilized to enable the soil or clay to form solid durable building materials.

OBJECTS OF THE INVENTION

It is a principal object of the present invention to provide a low cost building structure through the use of a single-sided form in combination with a sprayable uilding material.

Another object of the present invention is to provide a low cost building structure through the use of an inflatable form.

Another object of the present invention is to provide a low cost building structure incorporating a multi-layer construction.

Another object of the present invention is to provide a low cost structure utilizing a single-sided form on which protuberances are provided to form door and window apertures.

Still another object of the present invention is to provide a method for producing a low cost structure which uses a sprayable building material.

BRIEF DESCRIPTIONS OF THE DRAWINGS

Additional objects and advantages of the present invention will become apparent during the course of the following specification when taken in connection with the accompanying drawings in which:

FIGS. 1A, 1B, 1C, 1D, 1E, and 1F are perspective views showing the successive steps in the construction of a building structure in accordance with the present invention;

DETAILED DESCRIPTION OF THE INVENTION

Figure 1A:
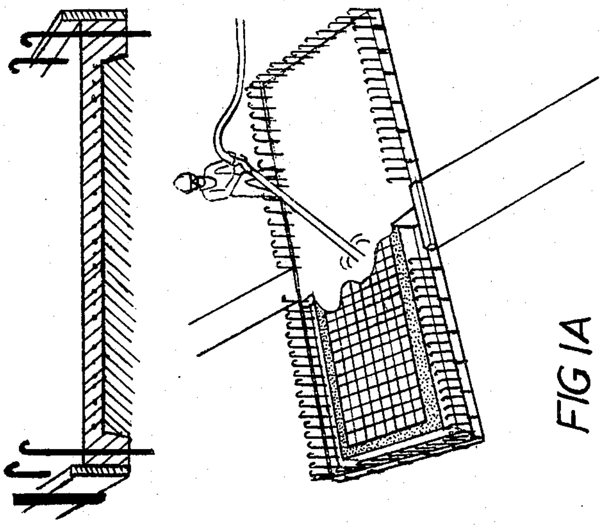
FIG. 1A shows the fabrication of a slab foundation.
Figure 1B:
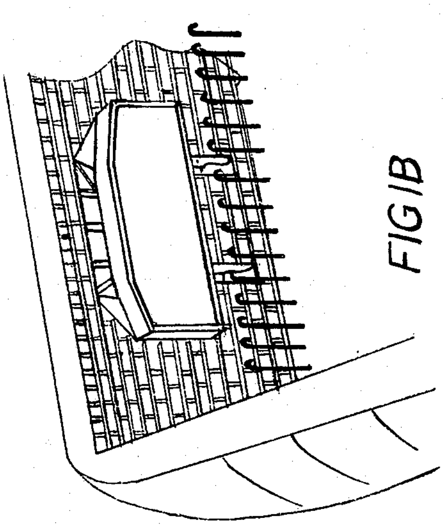
FIG. 1B shows a portion of an inflated balloon which has a textured inner surface.
Figure 1C:
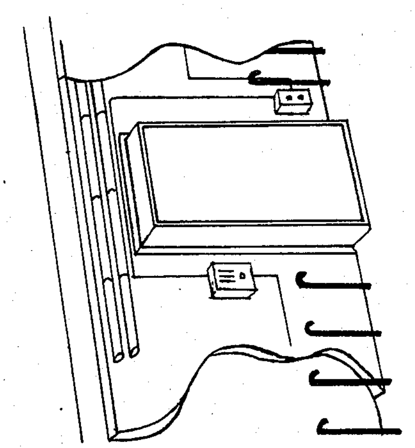
FIG. 1C shows the inside of the exterior half of the wall with electrical wiring and plumbing in place prior to fabrication of the interior half of the wall.

With reference to the drawing there is shown in FIGS. 1A through 1F the successive steps in the construction of the building structure in accordance with the present invention. FIG. 1A shows the fabrication of a slab foundation 10 which includes reinforcing bars 12 in a conventional manner. FIG. 1B shows a portion of a balloon structure 14 which forms a major novel feature of the present invention. The balloon 14 is inflated and placed on top of the slab foundation 10. The inner surface 16 of the balloon is textured to generally simulate the appearance of a brick wall and this inner surface is sprayed with the hardenable spray material which will be presently described. The balloon 14 includes a protuberance 18 which forms a window aperture in the sprayed material. FIG. 1C shows the inside 20 of the exterior half of the wall prior to fabrication of the interior half of the wall. The wiring 22 and plumbing 24 services are shown in place and a proturberance 26 is shown which is used to form the door aperture.

Figure 1D:
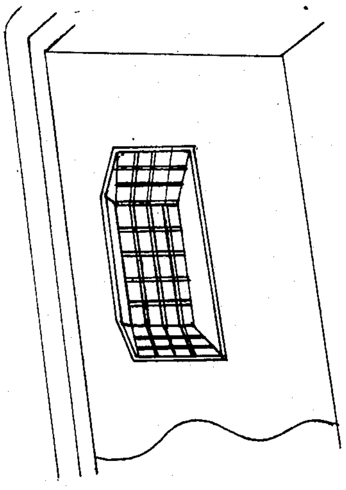
FIG. 1D shows the balloon structure for the fabrication of a bay window.
Figure 1E:
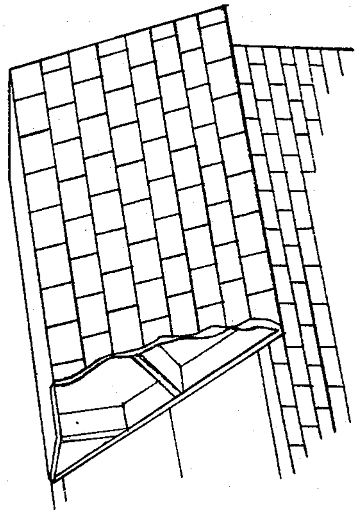
FIG. 1E shows a truss for the support of the roof.
Figure 1F:
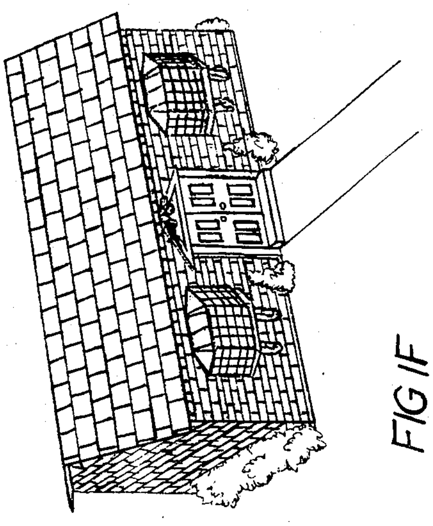
FIG. 1F shows an overall view of the completed structure.

FIG. 1D shows a bay window 28 fabricated on the wall and FIG. 1E shows a portion of the roof 30 broken away to show the use of a roof truss 32. FIG. 1F shows the completed structure 34.

Figure 2:
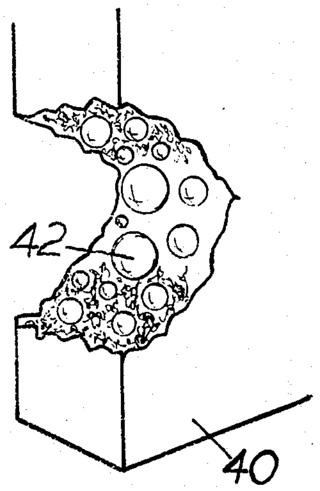
FIG. 2 shows air bubbles formed in the wall structure for thermal insulation and light weight.

FIG. 2 shows a portion of the wall 40 including a plurality of air bubbles 42 formed within the wall. The air bubbles 42 provide thermal insulation and reduce the weight of the wall.

Figure 3:
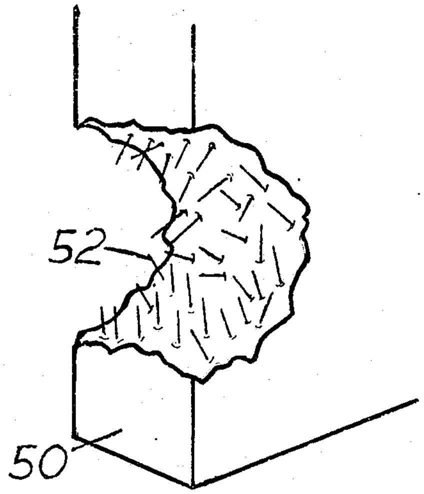
FIG. 3 shows fibers in the wall structure for reinforcement.

FIG. 3 shows a portion of wall 50 including a plurality of reinforcement elements 52. The reinforcement elements 52 shown are in the nature of generally cylindrical rod-like members which are randomly oriented within the wall 50. It is also within the scope of the present invention to utilize flat rectangular reinforcement members. A particularly effective configuration of the reinforcement members has been found to be ribbed or corrugated steel fibers manufactured under the trade name Xorex by the Ribbon Technology Corporation, Canal Winchester, Ohio. These fibers are made of steel and are approximately one-sixteenth to one-eight inch diameter and one inch to three inches long. The surface of these members is corrugated or convoluted. The use of these fibers in concrete in amounts ranging from 0.5 to 2.0 volume percent results in an increase in the concrete flextural strength value of over 100 percent.

The spray material utilized in the present invention which is alternatively referred to as a building material is a hardenable material which may be applied using conventional spray equipment such as is manufactured by the Allentown Pneumatic Gun Company. The building material may consist of a composition of cement, sand, sprayable plastic or urethane foam. Foaming agents may be introduced to generate bubbles for the purpose of decreasing the weight of the material used and improving the thermal properties.

Accelerators of known types and compositions such as flyasch may be used to speed the hardening of the cement thereby enabling a first layer applied to a form to harden quickly and provide support for subsequent layers.

Other building materials which may be used in accordance with the present invention include soil mixed with a soil hardener material which transforms soil into a rigid building material. A desireable soil hardner for this purpose has been found to be a product sold under the tradename CONSOLID by the firm Consolidated AG of Heersbougg, Switzerland.

Figure 4:
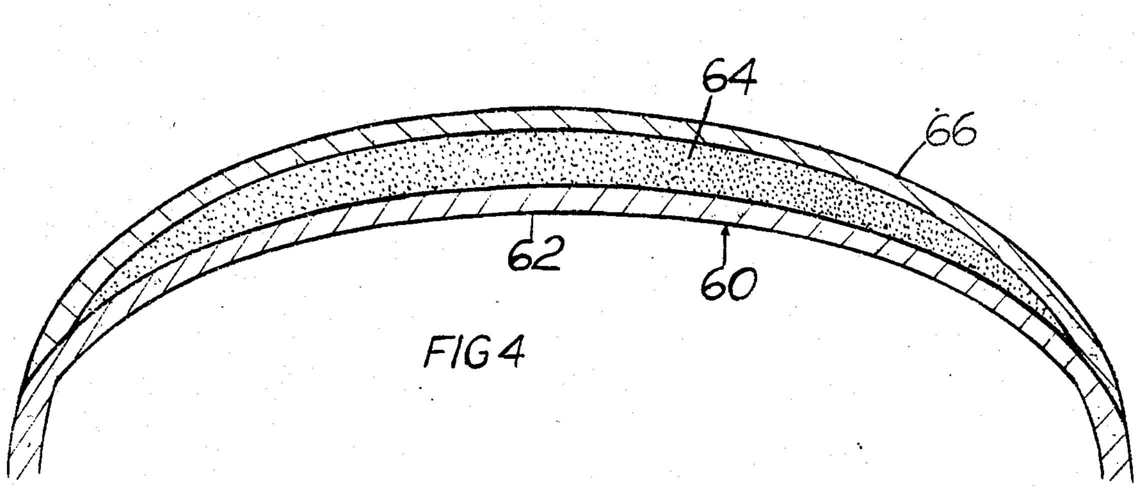
FIG. 4 is a fragmentary cross sectional view which shows a sandwich type roof formed of a layer of foam material between two protective and supporting layers of concrete.

FIG. 4 shows a portion of a roof structure 60 which is constructed by forming an inner concrete shell. Then forming a foam layer 64 on top of the inner concrete shell. An outer concrete shell 66 is then formed on top of the foam layer 64.

Figure 5:
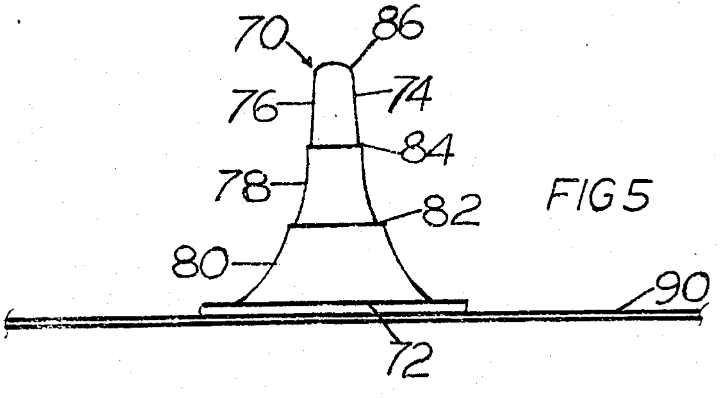
FIG. 5 shows a side view of a height measuring device according to the present inventiion which is used with the balloon.

FIG. 5 shows a height measuring device 70. The height measuring device has a flat base 72 and a measuring member 74 which is generally perpendicular to the base. The measuring member 74 is tapered and has three distinct zones 76,78,80 which are distinguished from each other by differences in diameter. In use, a plurality of height measuring devices 70 are used to ensure the uniformity of the thickness of a sprayed structure. The base 72 is adhered to a balloon form or other single sided form 90 and a first material is sprayed on to the form until the thickness of the first layer reaches the first step 82. A second layer is sprayed until the thickness reaches the second step 84 and the third layer is sprayed until the thickness reaches the top 86 of the height measuring device 70.

Figure 6:
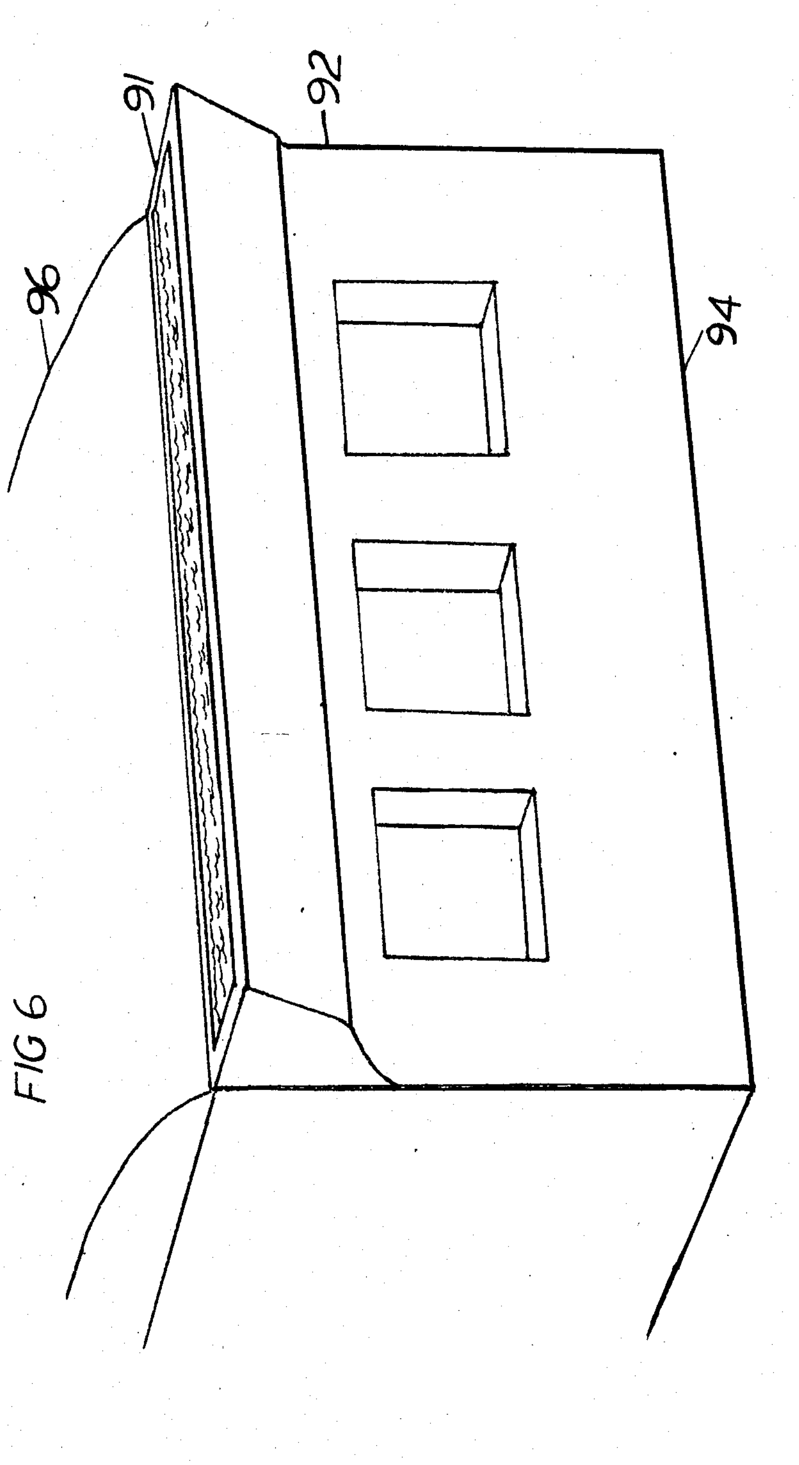
FIG. 6 shows an alternative embodiment of the invention having an integrally formed water trough incorporated at roof level in accordance with the invention to provide a fluid head for the water pressure for the internal plumbing of the structure.

FIG. 6 shows another embodiment of the invention including a water trough 91 which is integrally formed on the upper portion of the wall 92 of the structure 94. The water trough catches the run-off of rain falling on the roof 96 and provides a reservoir for water storage and also a fluid head for water pressure for the internal plumbing of the structure 94.

Figures 7A, 7B:
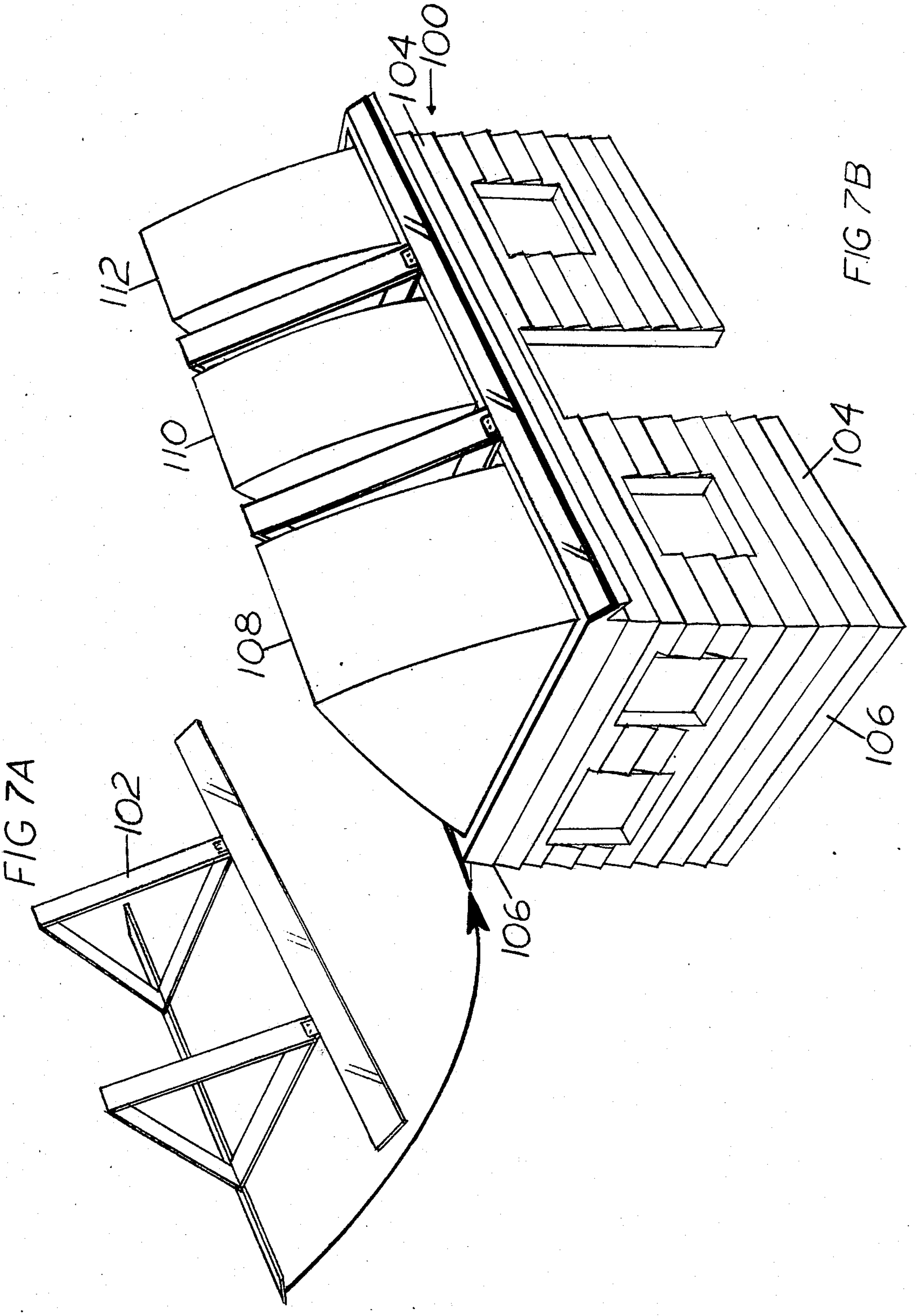
FIG. 7A is a perspective view of a truss structure which will be embedded in the structure material.
FIG. 7B is a perspective view of the truss structure of FIG. 7A placed on the walls of the structure prior to the spraying of the structural material.

FIGS. 7A and 7B show another embodiment 100 of the invention which utilizes a truss structure 102. The truss structure 102 shown in FIG. 7A is placed on top of previously formed walls 104,106 and the spaces between the trusses are filled with triangular shaped balloon members 108,110,112 and the truss structure 102 are sprayed with a structural material and the truss structure 102 is embedded within the structure which is formed by the structural material.

Figure 8:
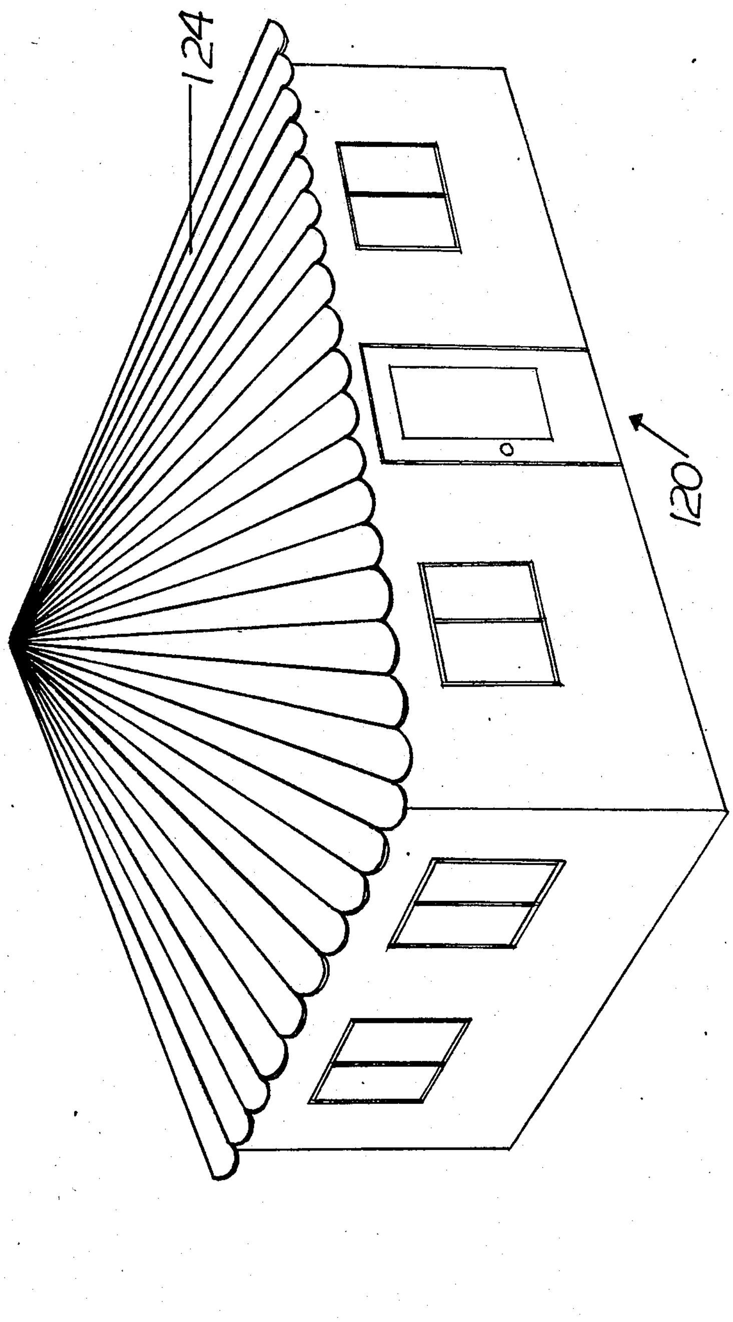
FIG. 8 is a perspective view of the structure fabricated according to the present invention having a radially patterned roof.

FIG. 8 shows another embodiment 120 of the invention in which the roof 122 has a generally conical form which includes a plurality of flutes which is indicated typically by the flute 124. The roof is formed by spraying a building material onto a tent-like form which is supported by a central pole.

Figure 9C:
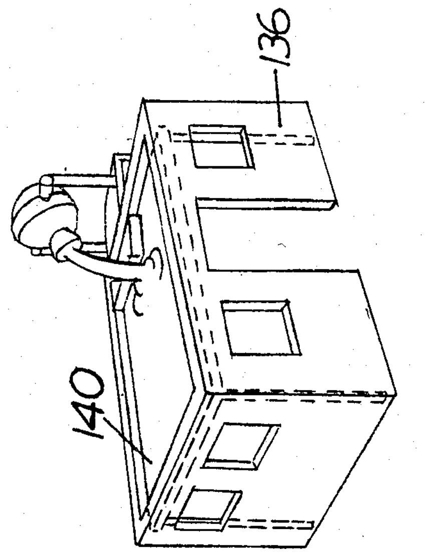
FIGS. 9A, 9B, 9C, 9D, 9E show the successive steps in the fabrication of a two story structure in accordance with another embodiment of the present inventon.
Figure 9B:
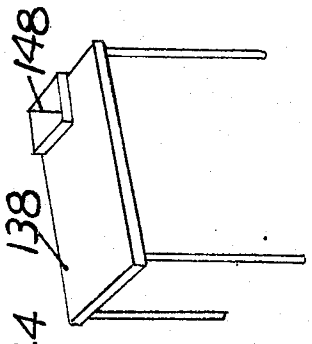
Figure 9A:
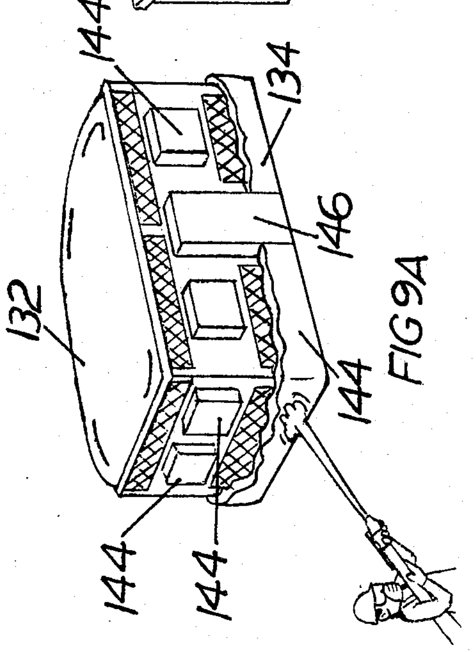
Figure 9E:
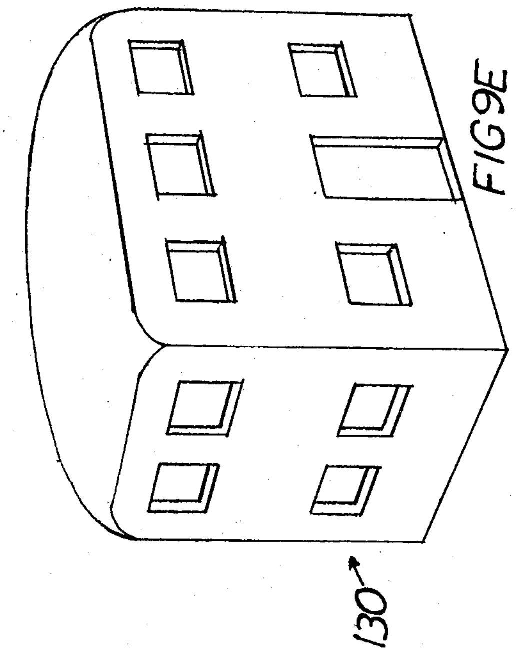
Figure 9D:
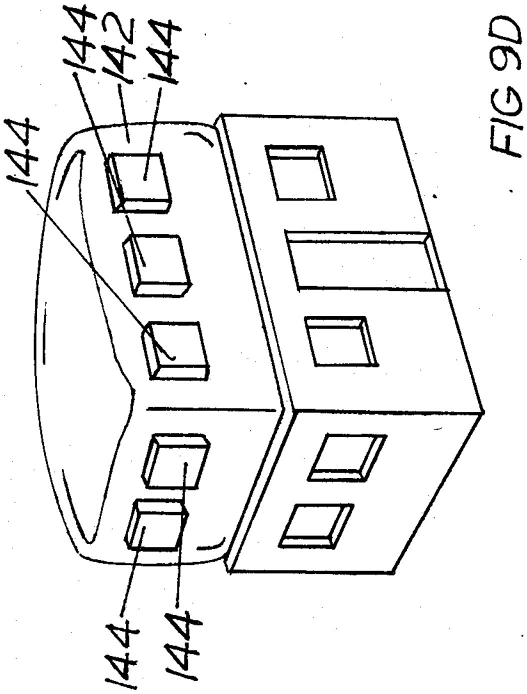

FIGS. 9A through 9E show another embodiment of the invention in which a 2-story structure 130 is formed using an inflated balloon form 132 is sprayed with a building material to form the walls 134 of the first story 136 of the structure 130. A table-like form 138 shown in FIG. 9B is placed within the previously formed walls. A building material 140 is applied to the top surface of the form thereby forming a floor as is shown in FIG. 9C. An inflated balloon form 142 is placed on top of the floor, FIG. 9D, and a building material is applied to the balloon form 142 in a manner similar to that applied to that which has been shown in FIG. 9A thereby forming the two story structure 130 shown in FIG. 9E. The balloon forms, 132,142 include projecting portions 144,146 which form the door and window apertures and the form 138 includes a projecting portion 148 which forms an aperture connecting the upper and lower floors of the structure 130.

Figures 10A, 10B, 10C, 10D, 10E, 10F, 11:
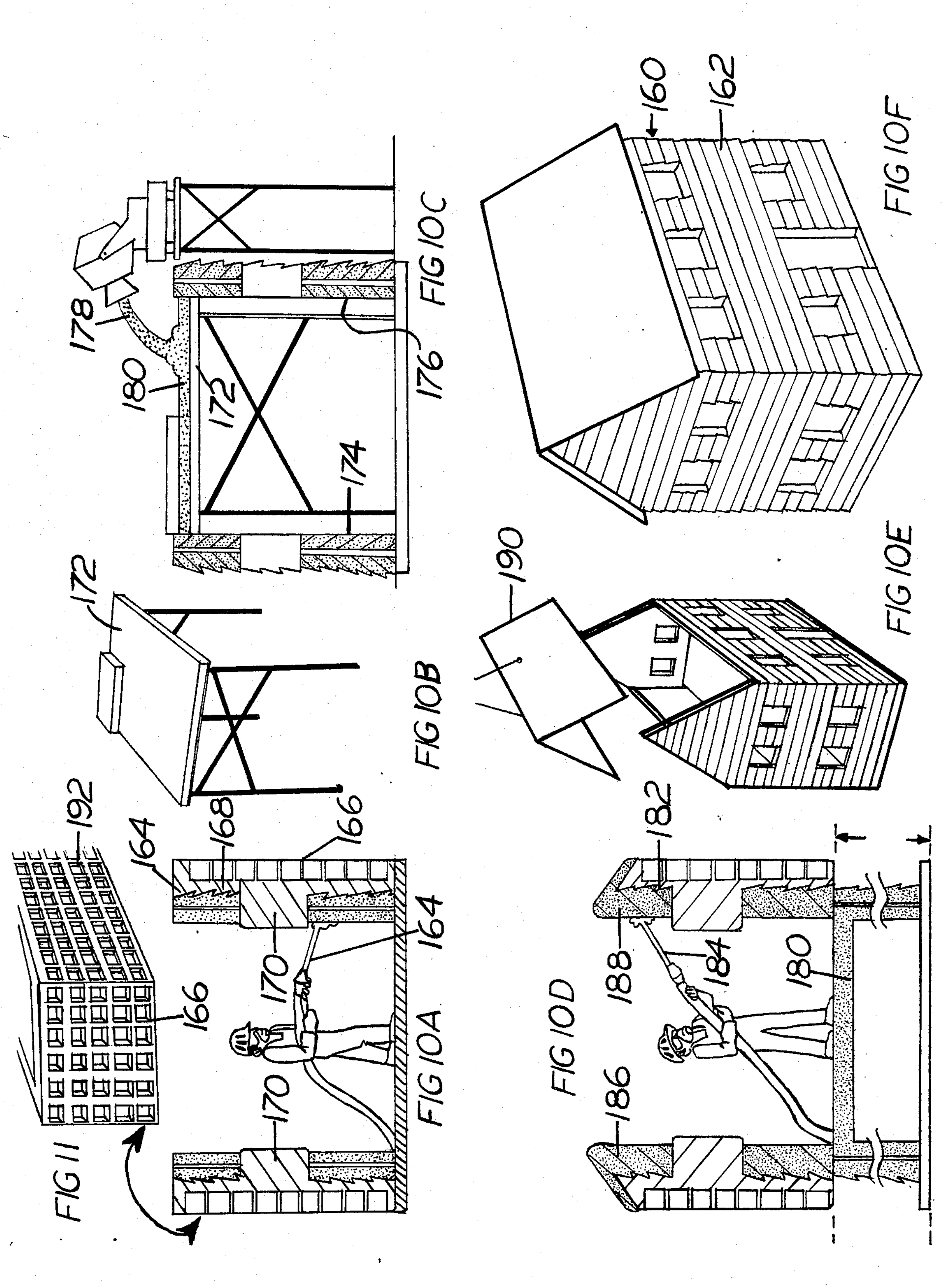
FIGS. 10A, 10B, 10C, 10D, 10E and 10F show the successive steps in the fabrication of the two story structure having textured walls in accordance with another embodiment of the present invention.
FIG. 11 is a perspective view of the balloon form used in the fabrication of the structure of FIG. 10.

FIGS. 10A through 10F show another embodiment of the invention in which a two story structure 160 is formed with the structure having textured walls 162 which simulate the appearance of conventional siding. In FIG. 10A a building material 164 is applied to the inside surface of an inflated balloon form 166. The inside surface of the balloon form is textured with a plurality of inclined surfaces 168 which simulate the appearance of convention siding. The balloon form 166 also includes protuberances 170 which form window aperatures. A table-like form 172 shown in FIG. 10B, is placed inside the walls 174,176 formed in FIG. 10A as is shown in FIG. 10C and a building material 178 is applied to the top surface of the form 172 to form a floor 180. When the floor 180 is completed, a second inflated balloon form 182 is placed on top of the floor 180 and a building material 184 is applied to the inside surface thereby forming the walls 186,188 of the second story of the structure 160 as is shown in FIG. 10D. When the walls of the second story are complete, a roof 190 is added as shown in 10E. The completed structure 160 is shown in 10F. The second balloon form 182 may be different in configuration than the first balloon form 166 or alternatively the first balloon form can be reused to form the second story.

FIG. 11 is a perspective view of the balloon form 166 used in FIGS. 10A–10D showing the outer wall of the balloon form as having a grid-like structure which forms a plurality of cells 192. The grid-like structure contributes toward the overall rigidity of the balloon form.

Figure 12A:
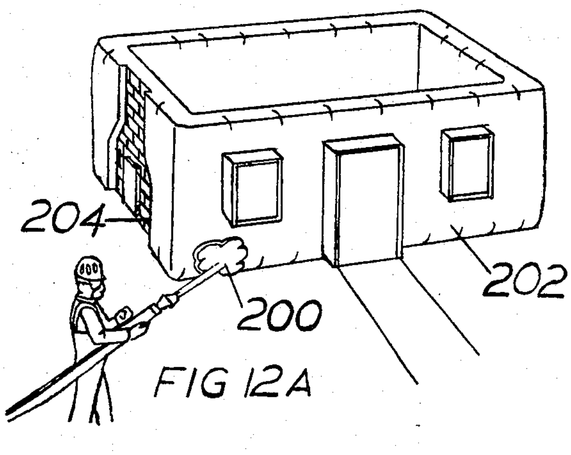
FIGS. 12A, 12B, 12C, 12D, 12E, 12F show six alternative methods for achieving patterned surface on the structure.
Figure 12B:
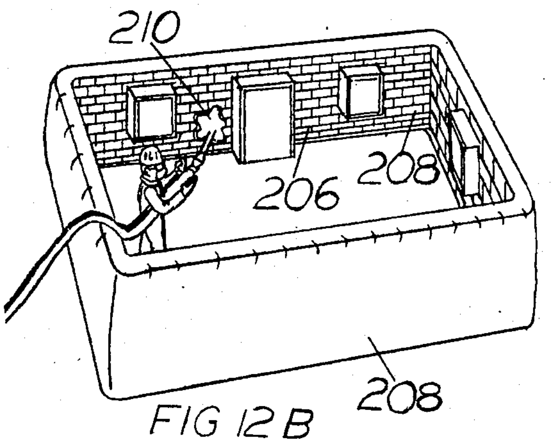

FIGS. 12A through 12F show six alternative methods for forming a patterned surface on a structure using a balloon form. In FIG. 12A a building material 200 is applied to the outside surface of the balloon 202 and the outer surface of the balloon form is configured to provide the desired pattern. The pattern being formed is shown, by way of example, as that of a fireplace 204. FIG. 12B is similar to FIG. 12A with the exception that the inner surface 206 of the balloon form 208 is configured to provide the desired pattern which is shown by way of example, as a simulation of a brick wall and the building material 210 is applied to the inner surface 206.

Figure 12C:
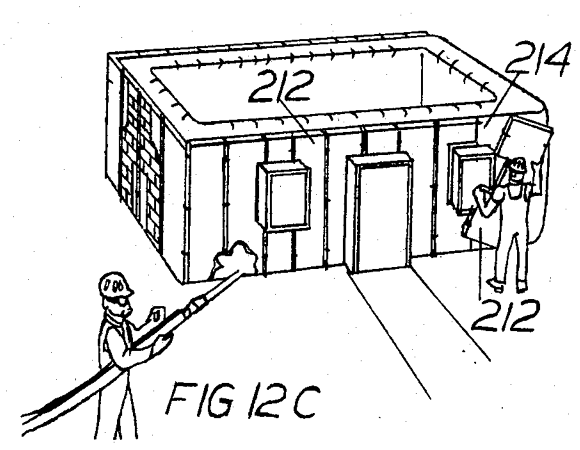
Figure 12D:
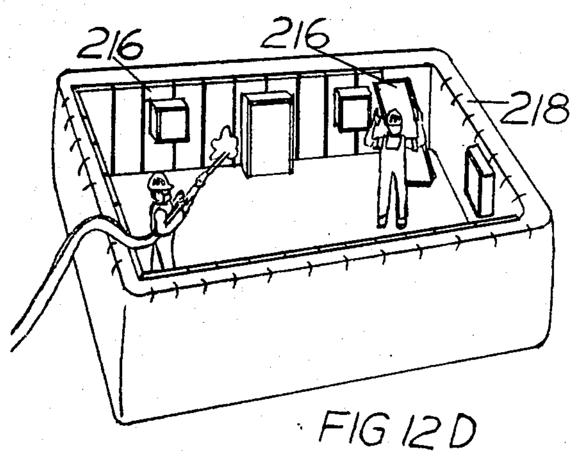
Figure 12E:
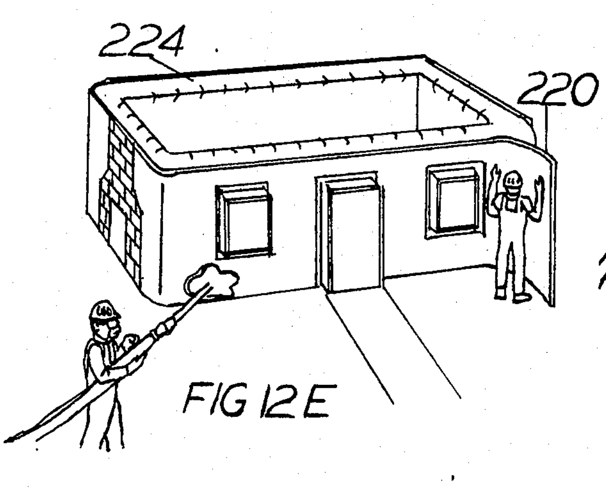
Figure 12F:
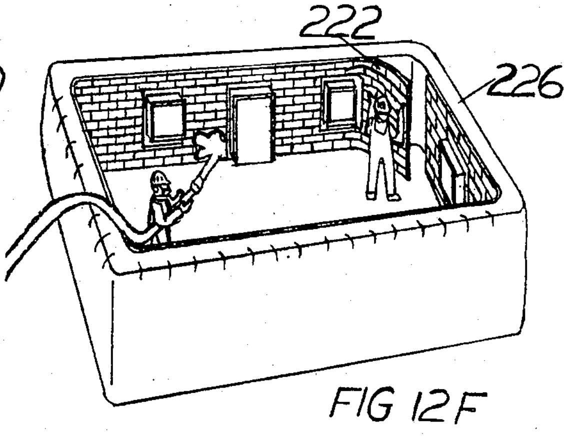

In FIG. 12C a plurality of individual panels 212 are attached to the outer surface of the balloon 214 and the outer surface of the panels includes the desired pattern. The building material 214 is applied to the outer surface of the panels 212. FIG. 12C is similar to 12B with the exception that the panels 216 are applied to the inner surface of the balloon 218. In FIG. 12E the individual panels are replaced by a large sheet 220 which may be rigid or semi-rigid and which incorporates the desired pattern. FIG. 12E shows the sheet 222 applied to the outside of the balloon form 224 and FIG. 12F shows the sheet 222 applied to the inside of the balloon form 226.

Figures 13A, 13B, 13C, 13D, 13E, 13F, 13G, 13H, 13I:
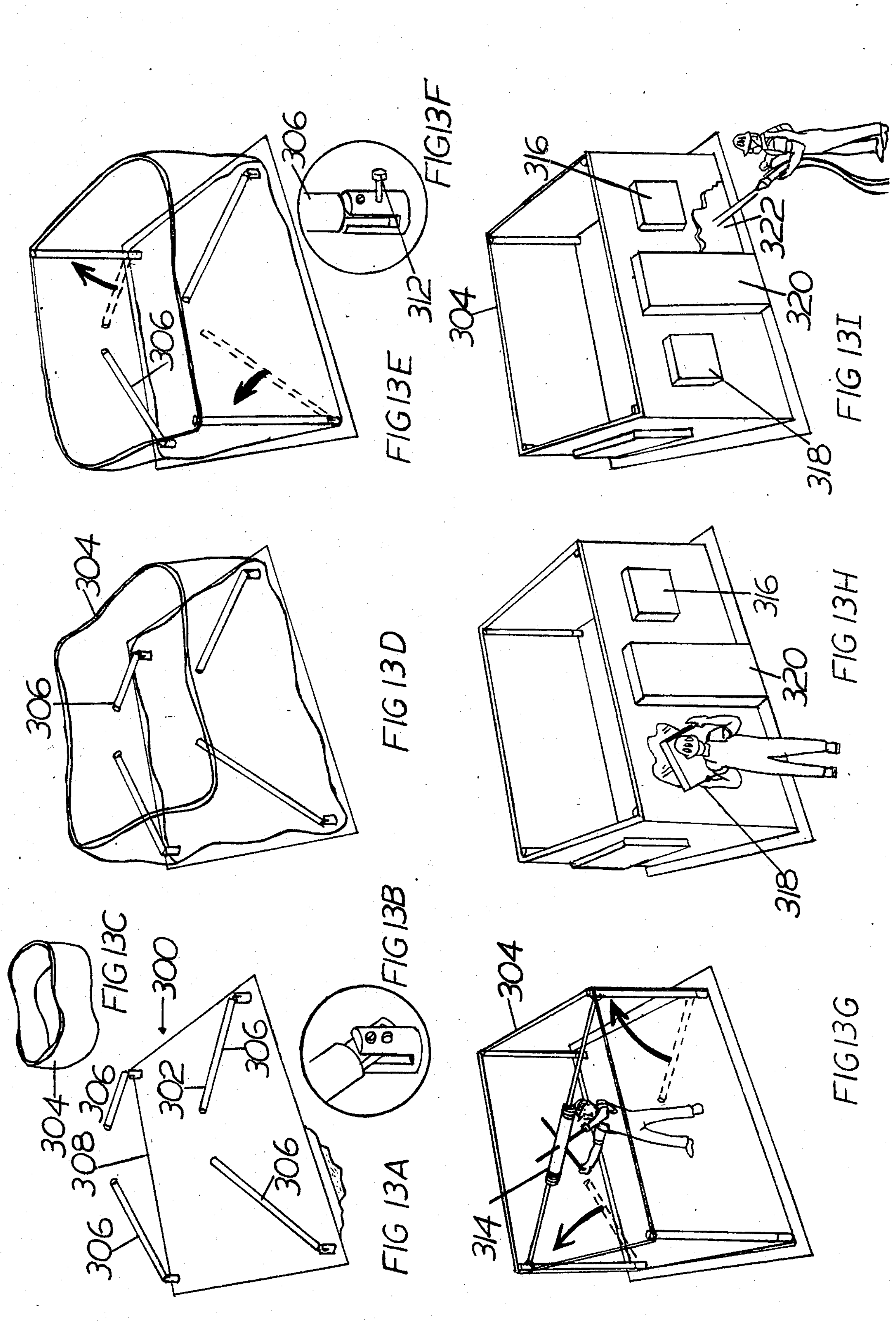
FIGS. 13A, 13B, 13C, 13D, 13E, 13F, 13G, 13H, 13I show successive steps in forming a structure using a frame apparatus to stretch a membrane which is used as a one sided form in accordance with another embodiment of the present invention.

FIGS. 13A through 13I show the successive steps in forming a structure using another embodiment 300 of the invention in which a frame 302 apparatus is used to stretch a membrane thereby providing a one-sided form. FIG. 13A shows the frame apparatus 302 as having four leg members 306 each of which is pivotally connected at its lower end to base a member 308. An enlarged view of the pivotal connection 310 is shown in FIG. 13B. FIG. 13C shows an overall view of the membrane member 304. FIG. 13D shows the membrane member 304 placed around the partially erected legs 306. FIG. 13E shows the legs 306 being swung into a vertical orientation and locked in place by means of a pin member 312 which is shown in FIG. 13F. FIG. 13G shows the membrane 304 being tightened by means of an adjustable strut 314 placed between the diagonally opposite legs. FIG. 13H shows individual members being attached to the taut membrane in order to form protuberances 316,318,320. The protuberances may be attached by any one of the number of known attachment means such as tape, glue or hook and loop fasteners. FIG. 13I shows building material 322 being applied to the outside of the membrane 304 and the protuberances 316,318,320 forming a door and windows.

Figures 14A, 14B, 14C, 14D, 15A, 15B, 15C, 15D:
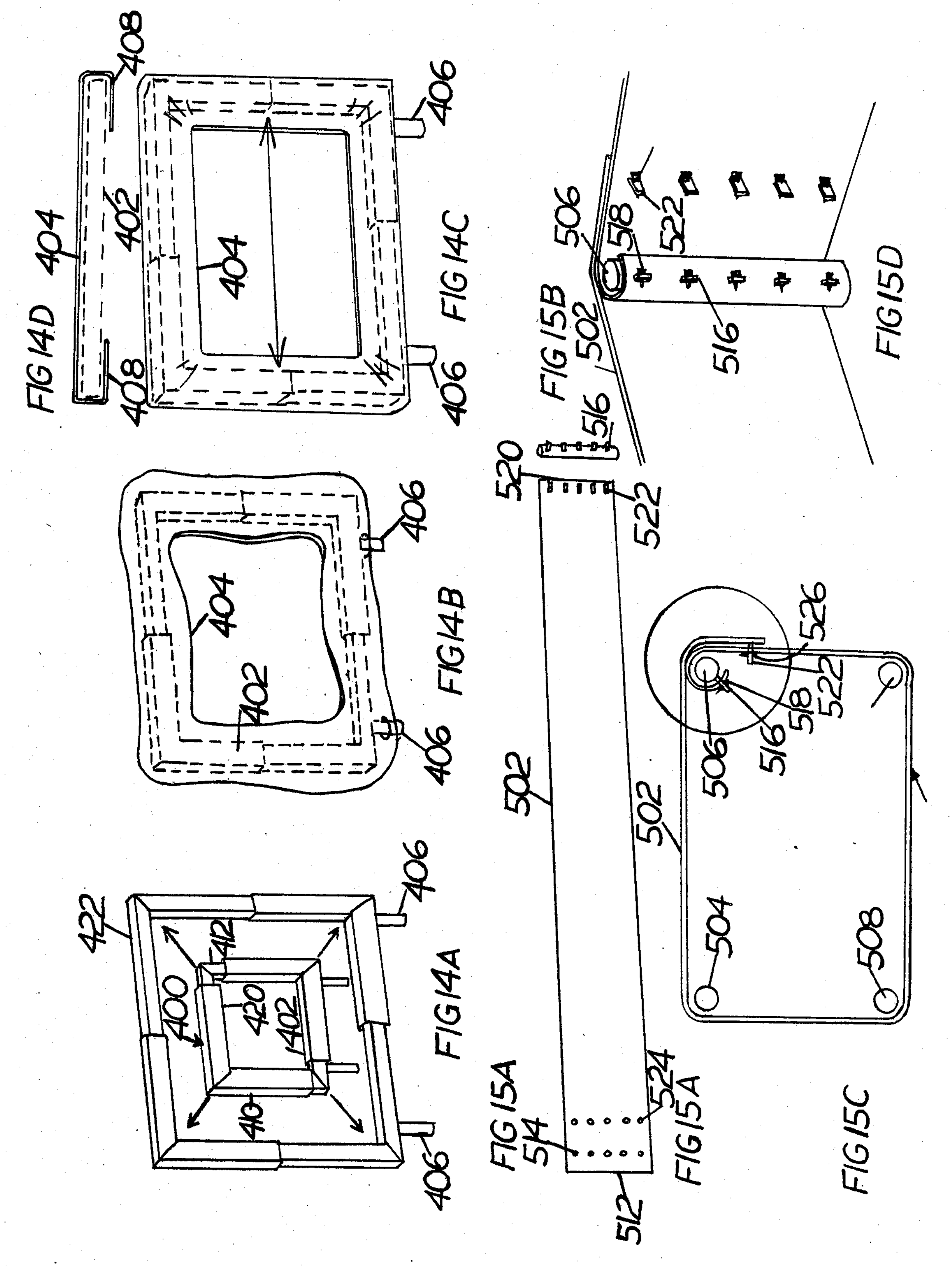
FIGS. 14A, 14B, 14C, 14D show the use of a telescoping rectangular frame apparatus to stretch a membrane in accordance with another embodiment of the present invention.
FIGS. 15A, 15B, 15C, 15D show the use of an apparatus according to another embodiment of the present invention which stretches a membrane around four vertical corner posts.

FIGS. 14A through 14D show the successive steps in using another embodiment 400 of the invention in which a frame apparatus 402 is used to stretch a membrane 404 in order to form a one-sided form. The apparatus of FIG. 14A shows the apparatus 400 comprising a rectangular frame 402 formed by telescoping members 410,412. FIG. 14A shows the frame 402 in the retracted position identified by reference number 420 and in the extended position identified by reference number 422. FIG. 14B shows the membrane 404 placed over the frame 402. The frame includes projecting portions 406 which pass through holes in the membrane 404 in the extended position thereby stretching the membrane 404. FIG. 14D shows a cross-sectional view of the stretched membrane 404 with the frame members 402 shown symbolically in broken lines. The periphery of the membrane includes a pocket portion 408 into which the frame member fits.

FIGS. 15A through 15B show another embodiment of the invention 500 in which an elongated membrane 502 is placed around a set of four vertically disposed members 504,506,508,510 to form a rectangular one-sided form. The membrane 502 includes a first end portion 512 which includes a plurality of holes 514 which are disposed to fit, one each, over a series of rectangular clips or staple-like members 516 which are mounted on one of the vertically diposed members 506. The membrane 502 is retained by a plurality of wedges 518 which are inserted, one each, into the clip members 516 as is shown in FIGS. 15C and 15D. The opposite end 520 of the membrane 502 has a plurality of clip members 522 which are similar to the clip members 516 and which pass through a series of holes 524 in the membrane. The end 520 of the membrane is secured by a plurality of wedges 526 which are inserted, one each, into the clip members 522.

Figures 16A, 16B, 16C:
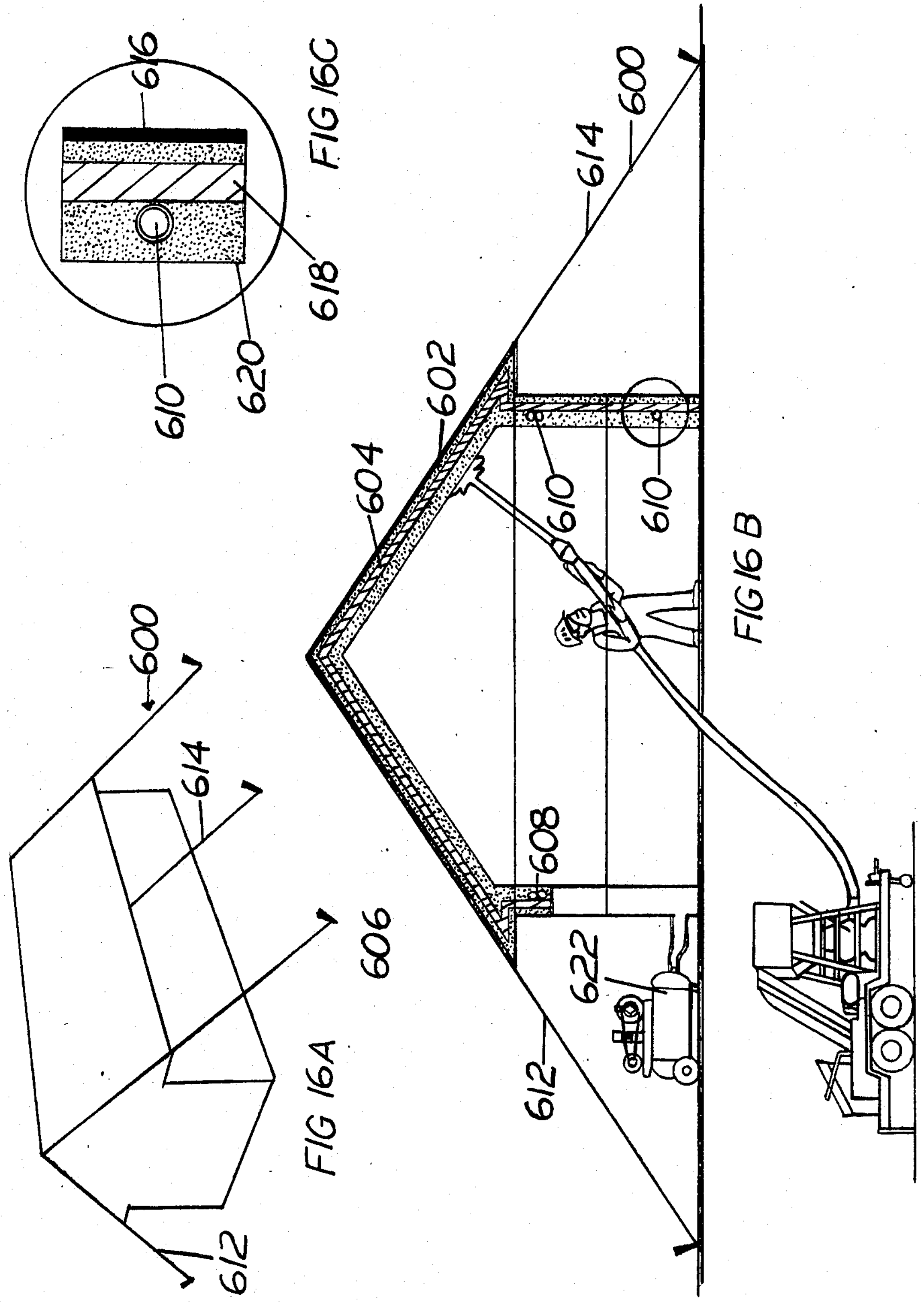
FIGS. 16A, 16B, 16C, show another embodiment of the present invention which features the use of a membrane type of one-sided form which utilizes guy cables.

FIGS. 16A through 16C shows another embodiment 600 of the invention which utilizes a flexible inflated envelope 602. The envelope 602 is retained in position by a series of guy cables 612,614 which maintain the surfaces of the envelope in a generally flat configuration. The inside surface of the envelope 602 is coated with urethane thereby forming planes 604,606 on which tube or conduit members 608,610 are installed. The tube or conduit members may be used for electrical wiring or plumbing services. FIG. 16C shows a portion of the construction drawn to an enlonged scale. The construction includes the envelope 616, the urethane layer 618, the conduit 610 and the building material 620 which may be sprayed concrete. Inflation of the envelope 602 is accomplished by means of an air compressor 622 which introduces air into the envelope 602 via the door assembly 624.

Figure 17A:
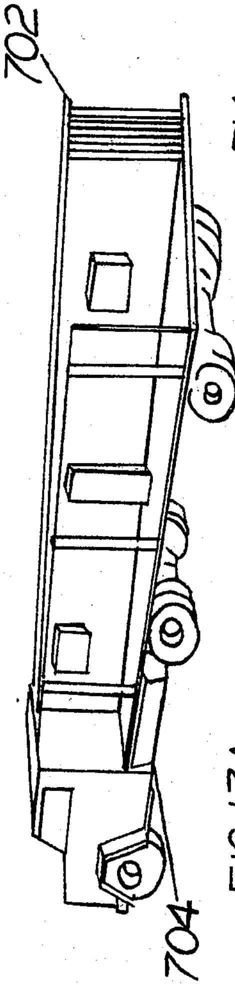
FIGS. 17A, 17B, 17C, 17D 17E show still another embodiment of the present invention which features the use of a one-sided form using rigid panels in accordance with the present invention.
Figure 17B:
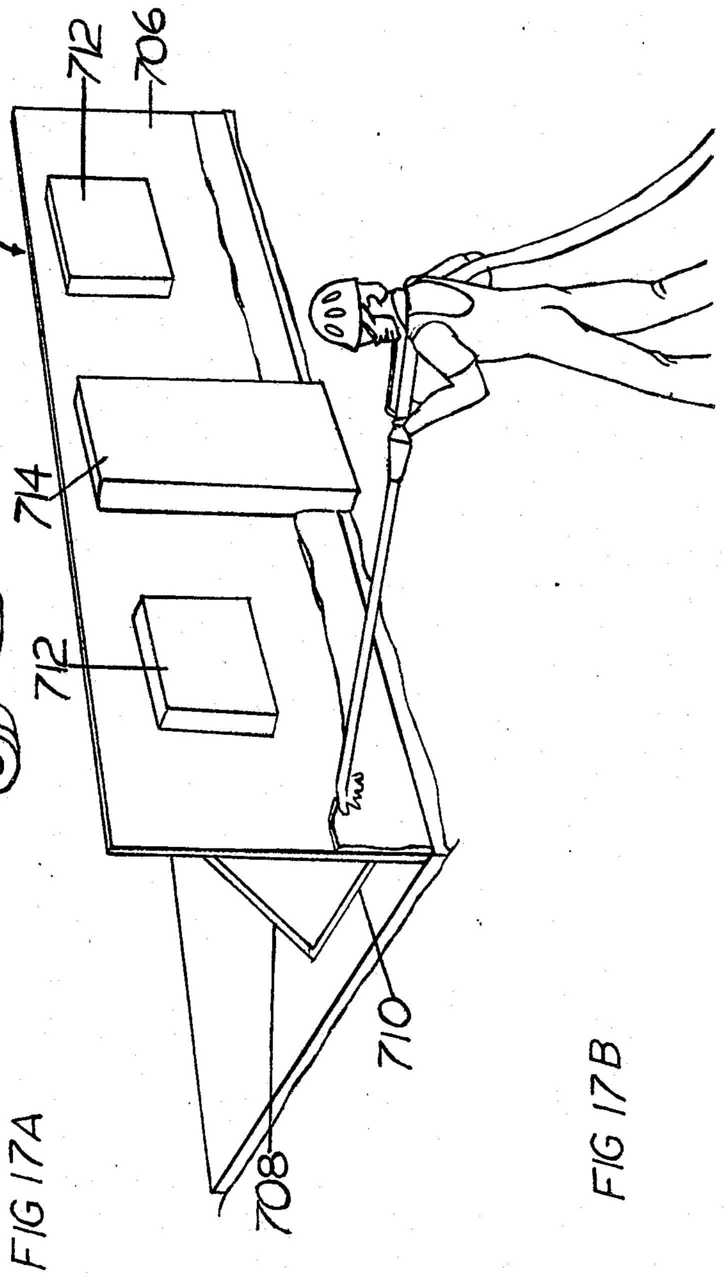
Figure 17C:
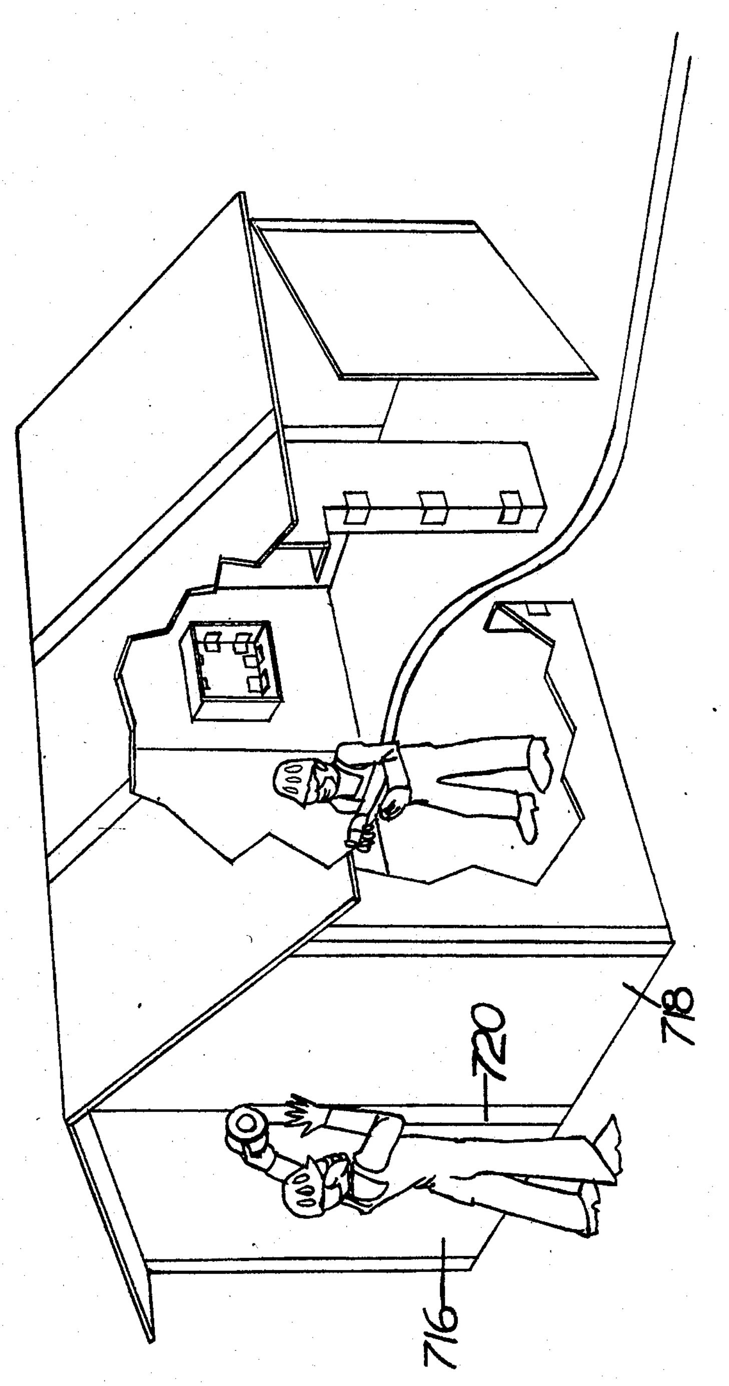
Figure 17D:
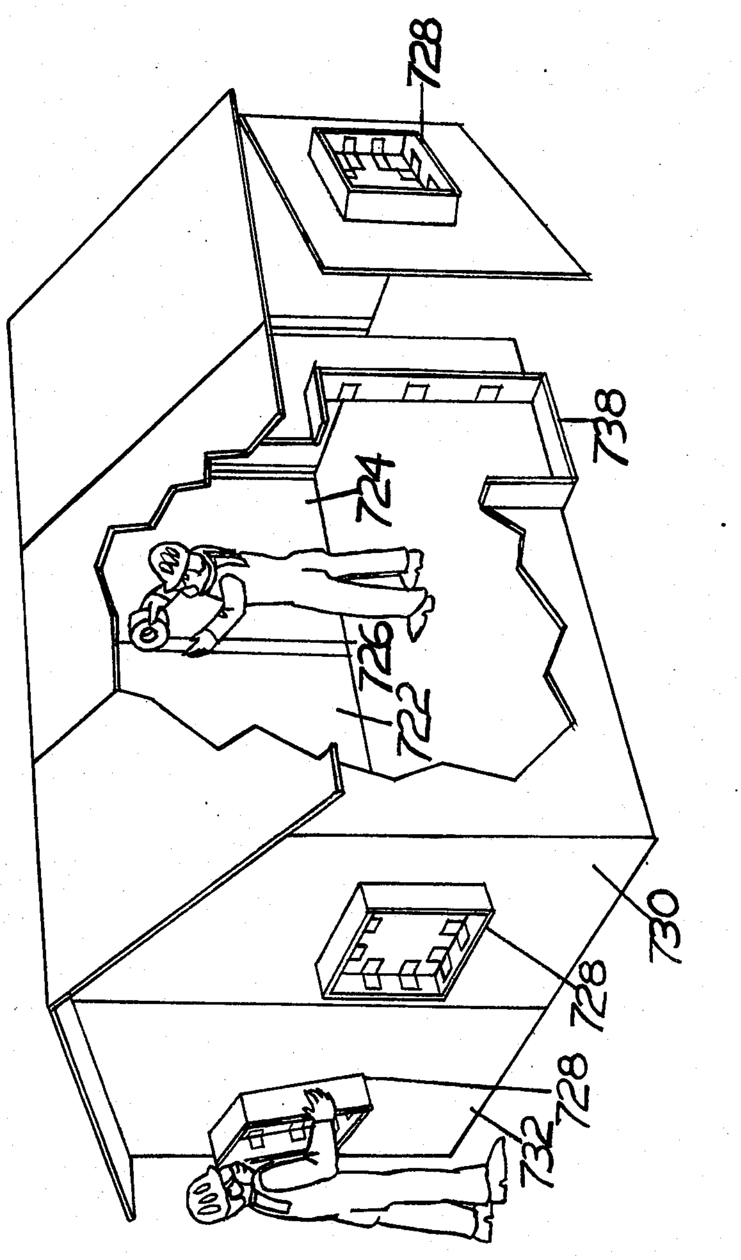
Figure 17E:
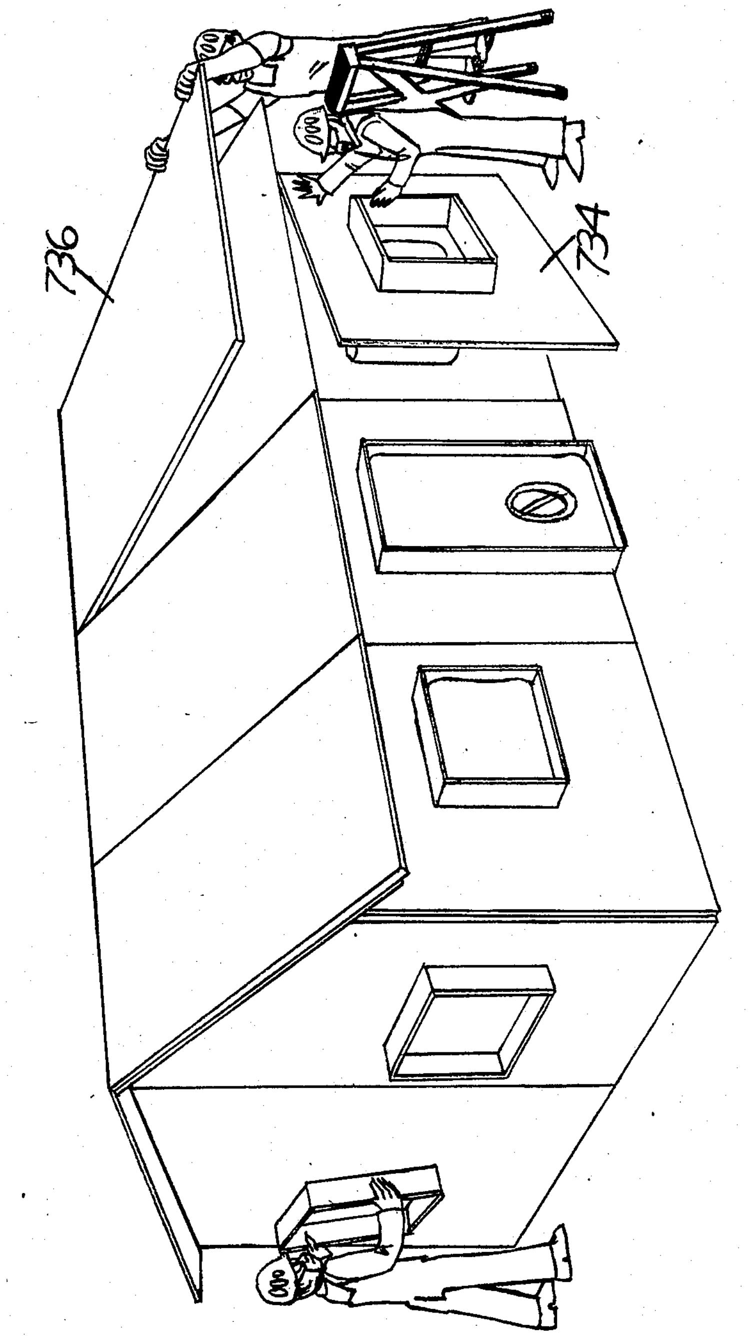

FIGS. 17A through 17D show still another embodiment 700 of the invention in which a one-sided mold is formed by a rigid panel. FIG. 17A shows a plurality of panels 702 being brought to the job site on a trailer truck 704. FIG. 17B shows a rigid panel 706 being supported in a vertical orientation by support members 708,710. The panel 706 includes protuberances which aid in forming door and window apertures. FIG. 17C shows the panels 716,718 being joined on the outside surface by tape 720 while a building material is applied to the inside surface. FIG. 17D shows the panels 722,724 being joined by tape 726 and additionally protuberances 728,738 for forming window and door apertures being attached to the panels 730,732 by means of tape. The use of tape facilitates the reconfiguration of the panels and the rearrangement of the window and door apertures to suit a variety of building configurations. FIG. 17E shows the removal of the panels 734,736 leaving the completed structure.

While preferred embodiments of the invention have been shown and described herein, it is obvious that numerous additions, changes and omissions may be made in such embodiments without departing from the spirit and scope of the invention.

What is claimed is:

1. An apparatus for the rapid construction of structures comprising an inflatable member having a plurality of integrally formed outwardly projecting protuberances with said protuberances inflateable along with said inflateable member, means for inflating said inflatable member, hardenable material, and means for applying said hardenable material to said inflatable member in areas between said protuberances thereby forming a shell structure with said protuberances forming apertures in said shell structure.

2. An apparatus according to claim 1 in which said means for applying a hardenable material comprise spray means.

3. An apparatus according to claim 1 in which said hardenable material comprises a concrete material.

4. An apparatus according to claim 1 in which said hardenable material comprises a mixture of a hardenable material and a multiplicity of reinforcing fibers.

5. An apparatus according to claim 4 in which said reinforcing fibers have a convoluted surface.

6. An apparatus according to claim 1 in which said hardenable material includes an agent for forming a multiplicity of bubbles in said hardenable material.

7. An apparatus according to claim 1 which said inflatable member further comprising means for maintaining portions of said inflatable member substantially flat.

8. An apparatus for the rapid construction of structures according to claim 1 further comprising thickness measuring means for measuring the thickness of said hardenable material with said thickness measuring means mountable on said inflateable member and projecting outwardly from the surface of said inflateable member.

9. An apparatus according to claim 1 in which said inflateable member comprises textured surface means for the purpose of forming a corresponding textured surface in said shell structure.

* * * * *